United States Patent [19]
van Woesik

[11] Patent Number: 5,452,386
[45] Date of Patent: * Sep. 19, 1995

[54] FIBER OPTICS CONNECTOR AND A METHOD OF MAKING THE SAME

[75] Inventor: Egbertus T. C. M. van Woesik, s'Hertogenbosch, Netherlands

[73] Assignee: The Whitaker Corporation, Wilmington, Del.

[*] Notice: The portion of the term of this patent subsequent to Aug. 9, 2011 has been disclaimed.

[21] Appl. No.: 98,276
[22] PCT Filed: Jan. 22, 1992
[86] PCT No.: PCT/US92/00516
§ 371 Date: Jul. 28, 1993
§ 102(e) Date: Jul. 28, 1993

[30] Foreign Application Priority Data
Jan. 31, 1991 [GB] United Kingdom ............... 9102147
Dec. 12, 1991 [GB] United Kingdom ............... 9126364

[51] Int. Cl.⁶ ............................................. G02B 6/38
[52] U.S. Cl. ........................................ 385/72; 385/73
[58] Field of Search ................................ 385/70–74, 385/85

[56] References Cited

U.S. PATENT DOCUMENTS

| | | | |
|---|---|---|---|
| 4,255,016 | 3/1981 | Borsuk | 385/73 |
| 4,725,117 | 2/1988 | Ellis | 385/72 |
| 4,743,084 | 5/1988 | Manning | 385/85 X |
| 4,787,701 | 11/1988 | Stenger et al. | 385/70 |
| 4,890,897 | 1/1990 | Cook | 385/70 |
| 4,896,938 | 1/1990 | Mathis et al. | 385/70 |
| 5,337,385 | 8/1994 | Baderschneider et al. | 385/59 |

Primary Examiner—John D. Lee
Attorney, Agent, or Firm—Adrian J. LaRue; Eric J. Groen; Driscoll A. Nina

[57] ABSTRACT

A fibre optics connector comprises a moulded plastic housing with a through bore. The bore has a first bore portion of small cross-section, opening into a forward end of the housing and communicating with a larger cross-section bore portion. An intermediate fibre is bonded into the smaller cross-section bore portion, a length of the intermediate fibre projecting into the larger cross-section bore portion. The intermediate fibre has at its forward end a first optically polished end face and at its rear end a second optically polished end face. A longitudinally split, fibre alignment sleeve is expansible radially and is positioned in the larger cross-section bore portion. The sleeve receives the projecting length of the intermediate fibre and grips it. The rear optically polished end face of the intermediate fibre is covered by a refractive index matching material which has been injected into the sleeve. Thus the unprepared end face of the cladded core of an optical cable can be inserted into the sleeve so as to be in light conducting relationship with the rear end face of the intermediate fibre. The housing can also have a rear cavity, receiving a fibre retaining housing which grips the fibre by way of a clip. The housing is spring loaded forwardly by way of a coil spring urging the fibre into the intermediate fibre.

20 Claims, 14 Drawing Sheets

FIBER OPTICS CONNECTOR AND A METHOD OF MAKING THE SAME

BACKGROUND OF THE INVENTION

1. Field of the Invention

This invention relates to a fibre optic connector for optically connecting first and second optical fibres, the connector comprising a moulded plastics housing defining a through bore for receiving the first optical fibre through one end of the bore and the second optical fibre through the other end of the bore with the ends of the fibres in light conducting relationship. The invention also relates to a method of making such a connector.

2. Description of the Prior Art

The customer for such a connector, may, in many cases, be devoid of staff who are experienced in the preparation of polished optical fibre end faces which are necessary if light is to be correctly transmitted from one fibre to the other, and in any case, the necessary equipment for providing such optically polished surfaces, commonly known as mirror surfaces will not be available in the field of use of the connector.

Furthermore, all plastic fibres tend to change in dimension when they are exposed to temperature fluctuation. The plastic fibre will expand in diameter and shrink in its length. The plastic fibre also includes a jacket made of a plastic material which surrounds the fibre core and cladding material which has a different linear thermal expansion than the fibre core and the cladding material. Also the linear thermal expansion of these materials varies between the manufacturers of the plastic fibre cables. The axial movement (pistoning) between the fibre and the jacket can be as high as 1 mm, a significant axial length which, under normal circumstances of present day fibre optic connectors could take the fibre cable end out of engagement with its mating fibre. The present invention is intended to provide a fibre optics connector that is ready for use without the need for producing an optically polished end surface.

SUMMARY OF THE INVENTION

According to one aspect of the present invention a fibre optics connector as defined in the first paragraph of this specification, is characterized in that the bore has a smaller cross-section first bore portion opening into one end of the housing and a larger cross-section second bore portion opening into the other end of the housing, the first optical fibre being fixed in the first bore portion and having a first optically polished end face directed outwardly of the one end of the housing, a length of the first optical fibre projecting into the second bore portion and being received in a fibre alignment sleeve in the second bore portion, with a second optically polished end face of the first fibre within the sleeve and being covered by a refractive index matching material; whereby an optically unprepared end face of the second fibre can be inserted through said other end of the bore and into the fibre alignment sleeve into light conducting relationship with the second optical face of the first fibre.

The second end of the housing may, for example be formed as a plug so that once the second optical fibre has been inserted into the alignment sleeve, the connector can be mated with an optical fibre receptacle presenting the optically polished face of an optical fibre for engagement with the first optically polished end face of said first fibre.

The fibre alignment sleeve may be made of a resilient material and may be formed with a through longitudinal slit, so that the sleeve is radially expansible, the internal diameter of the sleeve being less than the overall diameter of the optical fibres, so that the sleeve resiliently grips the optical fibres. The sleeve may be provided with an external collar for guiding it through the second bore portion.

The sleeve may be made of a material having the same refractive index as the cladding of the first optical fibre, or the sleeve may be provided with a coating of the same refractive index as the cladding of the first optical fibre. The index matching material may have the same refractive index as the core of the second fibre.

A fibre fixing clip may be provided for securing the second optical fibre in the housing, the clip being moveable between a first portion in the housing to allow the second optical fibre to be inserted through the second bore portion, and a second position in which the clip secures the second optical fibre in the housing.

According to another aspect of the invention, a method of making a fibre optics connector for connecting first and second optical fibres, the connector comprising moulded plastics housing defining a through bore for receiving the first optical fibre through one end of the bore and the second optical fibre through the other end of the bore with the ends of the optical fibres in light conducting relationship is characterized by the steps of;

optically polishing one end of the first optical fibre;
inserting said first fibre through a first, smaller cross-section portion of the bore so that a length of said first fibre projects into a second, larger cross-section portion of the bore and so that the other end of said first fibre projects from an end of the housing, the polished one end of the first fibre lying within the second bore portion;
fixing said first fibre in said first bore portion;
optically polishing said other end of said first fibre so as to be flush with said one end of the housing, or so as to be convex in a direction away therefrom;
inserting a resiliently expansible fibre alignment sleeve of a smaller diameter than the overall diameter of said first fibre through said second bore portion so that the projecting length of said first fibre is received in said sleeve to extend through part of the length thereof; and
injecting an index matching material into the fibre alignment sleeve to cover said polished end of the first fibre; whereby an optically unprepared end of the second fibre can be inserted through the second bore portion into the sleeve, into light conducting relationship with said polished one end of the first optical fibre.

In another aspect of the invention where a fibre optic connector comprises a plug housing having a front meeting end and a rear fibre receiving end where the front meeting end has a through bore carrying an intermediate fibre having a front finished end and an inner end within the through bore, the connector is characterized in that the housing includes a fibre holding retainer positioned within a rear cavity which is in communication with the through bore. The retainer is floatable within the cavity under preload to ensure mating contact between the end of a fibre carried by the retainer and the inner end of the intermediate fibre.

DETAILED DESCRIPTION OF THE PREFERRED EMBODIMENT

Figure 1:
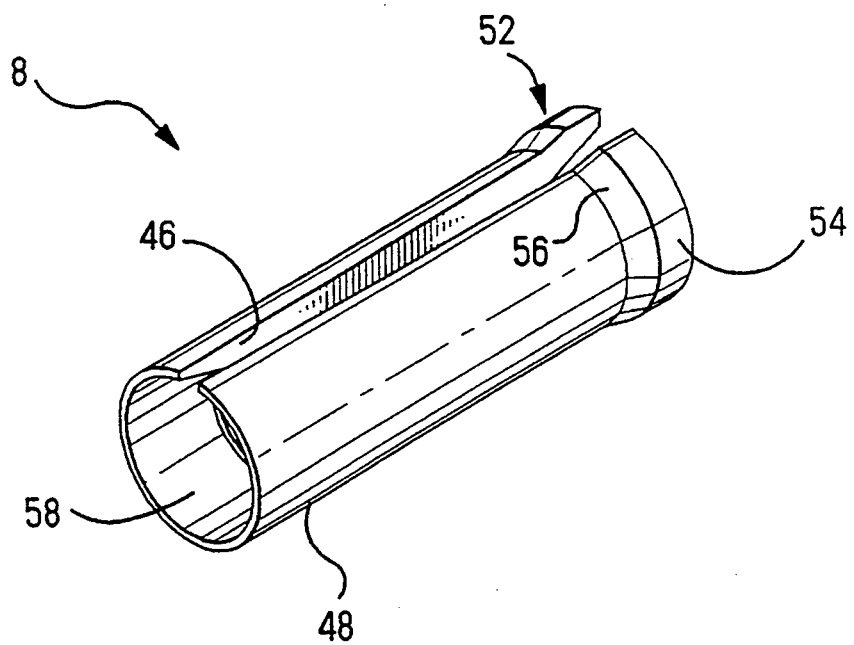
FIG. 1 is an enlarged isometric view taken from one end of a split plastics alignment sleeve for a quick termination fibre optics connector.
Figure 2:
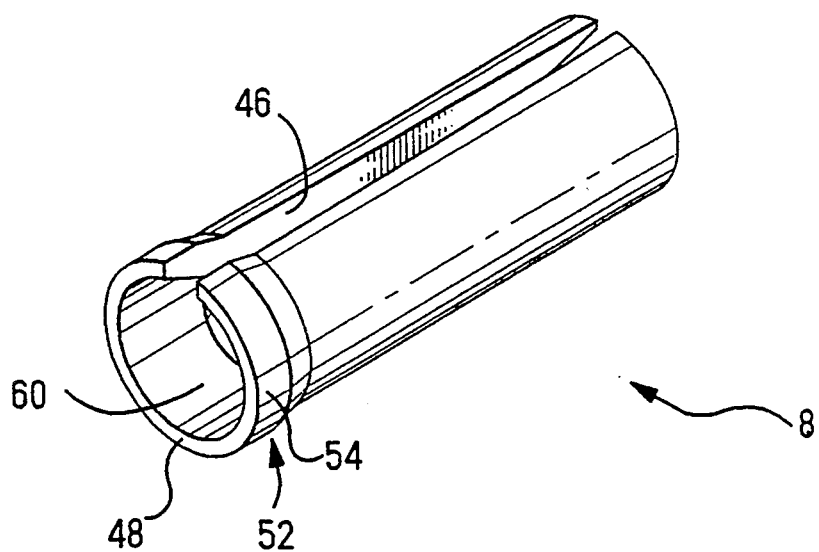
FIG. 2 is an isometric view of the alignment sleeve taken from the other end thereof.
Figure 3:
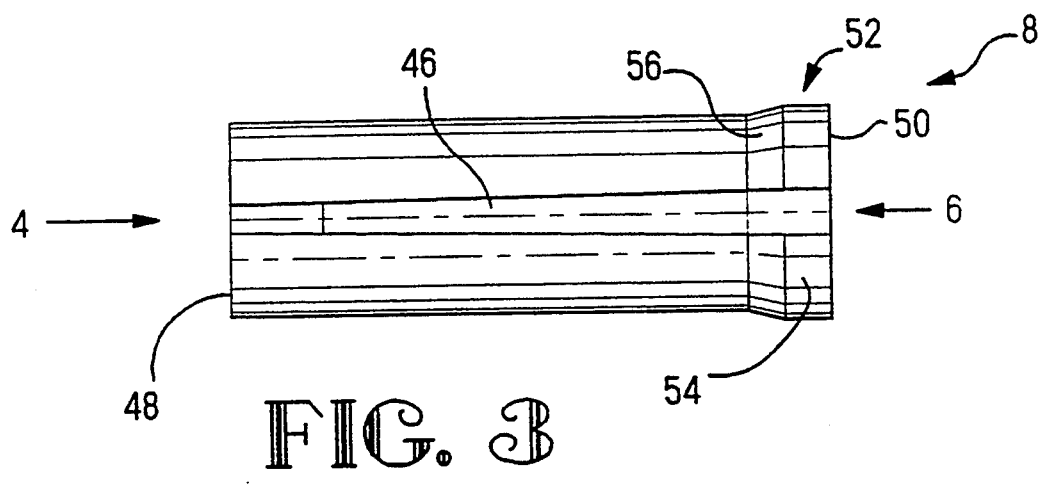
FIG. 3 is a side view of the alignment sleeve.
Figure 4:
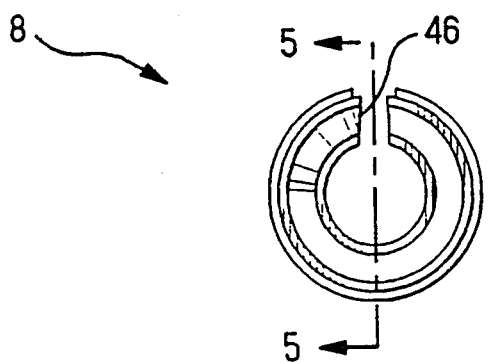
FIG. 4 is a view taken in the direction of the arrow 4 in FIG. 3.

A quick termination fibre optics connector 2 (FIGS. 15 and 16) comprises a connector housing 4, an intermediate optical fibre 6, an optical fibre alignment sleeve 8, a refractive index matching material 10, and a fibre fixing clip 12.

Figure 7:
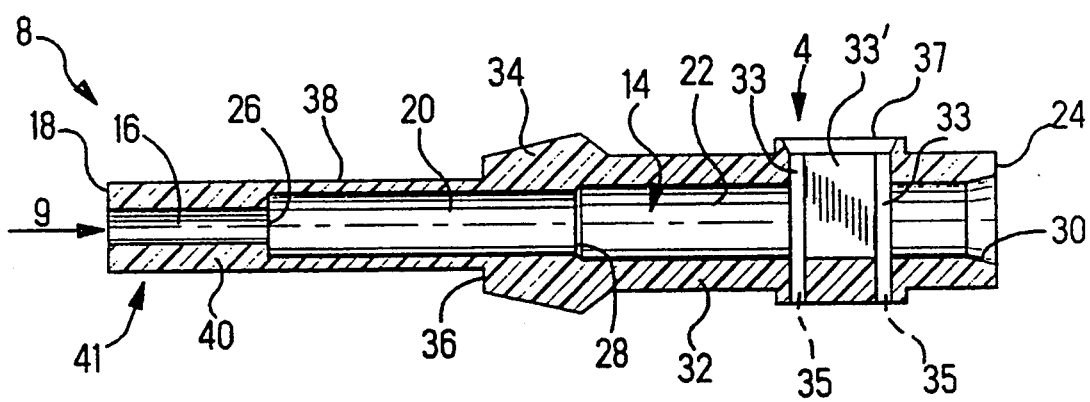
FIG. 7 is a partially diagrammatic axial sectional view of a housing of the fibre optics connection.
Figure 8:
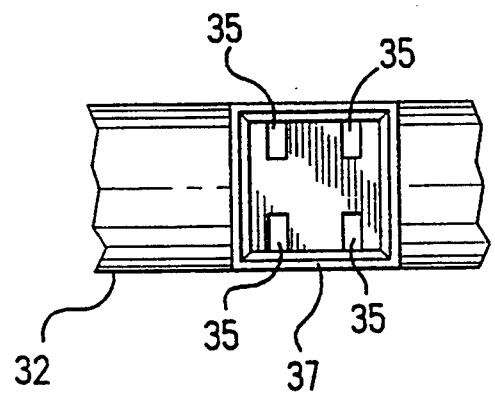
FIG. 8 is a fragmentary underplan view of the housing.
Figure 9:
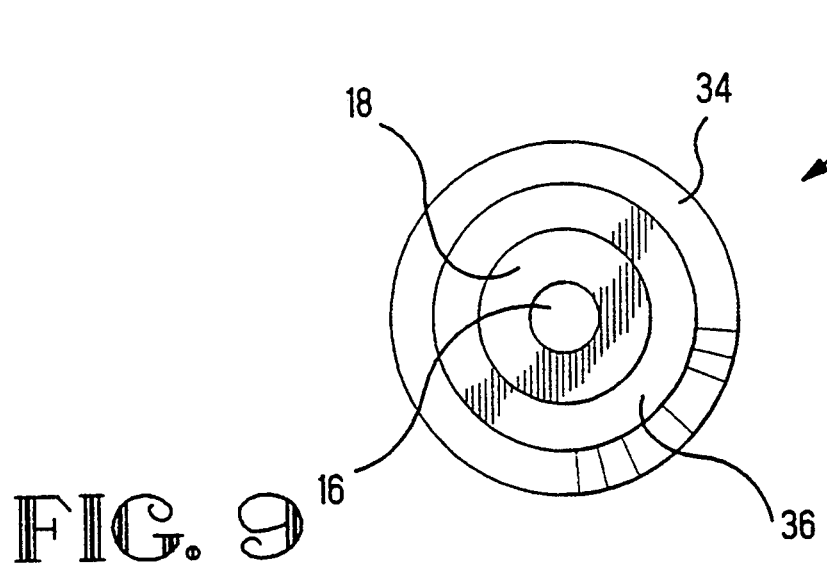
FIG. 9 is an enlarged end view of the housing taken in the direction of the arrow 9 in FIG. 7.

As best seen in FIGS. 7 and 9, the connector housing 4, which has been moulded in one piece from a suitable plastics material, is elongate and is of circular cross-section, having a circular cross-section through bore 14, having a smaller cross-section, intermediate fibre receiving, forward portion 16 opening into a forward mating face 18 of the housing 4, an intermediate, alignment sleeve receiving portion 20 of larger cross-section than the portion 16, and an optical cable receiving, forward portion 22 opening into an optical cable receiving rear face 24 of the housing 4, and being of larger cross-section than that the bore portion 20. The bore portions 16 and 20 co-operate to define a rearwardly facing, annular, alignment sleeve stop shoulder 26, the bore portions 20 and 22 co-operating to define an annular, forwardly tapered, frusto-conical alignment sleeve guiding shoulder 28. The bore portion 22 has a rearwardly flared optical cable guiding mouth 30 opening into the face 24. The rearward part of the housing 4 has a wall 32 which defines the bore portion 22, the wall 32 merging, proximate to the shoulder 28, with a frusto-conical, forwardly tapered, handle portion 34 of the greater thickness than the wall 32, terminating forwardly thereof in a forwardly facing stop shoulder 36 surrounding the bore portion 20. Forwardly of the shoulder 36, the bore portion 20, is defined by a wall 38, which is substantially thinner than the wall 32 or the adjoining wall 40, defining the bore portion 16. The walls 38 and 40 are of the same overall cross-section and define a plug 41 for mating with a fibre optics receptacle (not shown), the shoulder 36 serving to limit the insertion of the plug 41 into the receptacle. As best seen in FIGS. 7 and 8 the wall 32 is formed with internal slots 33 opening upwardly, and into a cavity 33', and communicating with holes 35 opening downwardly, for receiving the clip 12 as described below. The upward openings of the slots 33 are surrounded by a skirt 37.

Figure 10:
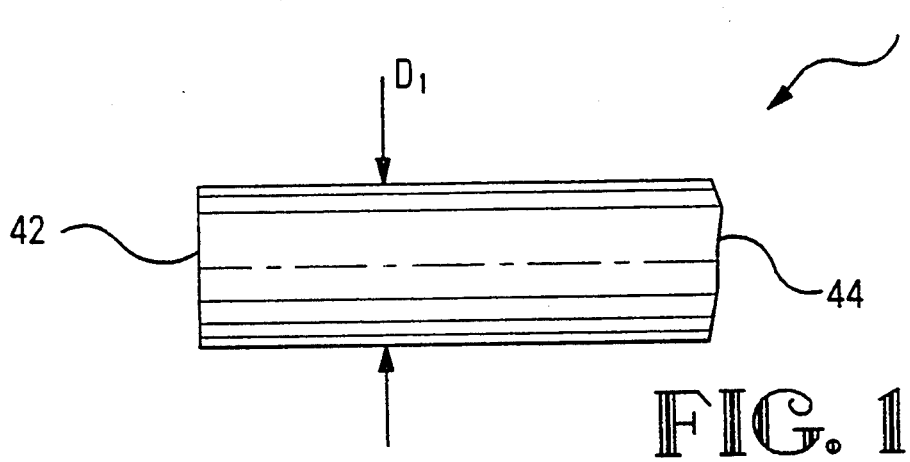
FIG. 10 is a side view of an intermediate optical fibre when prepared for assembly to the housing, one end of the fibre having been polished.

The intermediate optical fibre 6, which is best seen in FIG. 10, has been optically polished at its rearward end 42, the forward end 44 of the fibre not having been polished. The fibre 6, may for example, be of one thousand microns in its diameter D1, taken over its cladding. In any event, the diameter of the fibre 6 is selected for close tolerance with the bore portion 16 of the connector housing 4, or the bore portion 16 is formed for close tolerance with the diameter of the fibre 6. The bore portion 16 should be exactly concentric with the plug 41.

Figure 5:
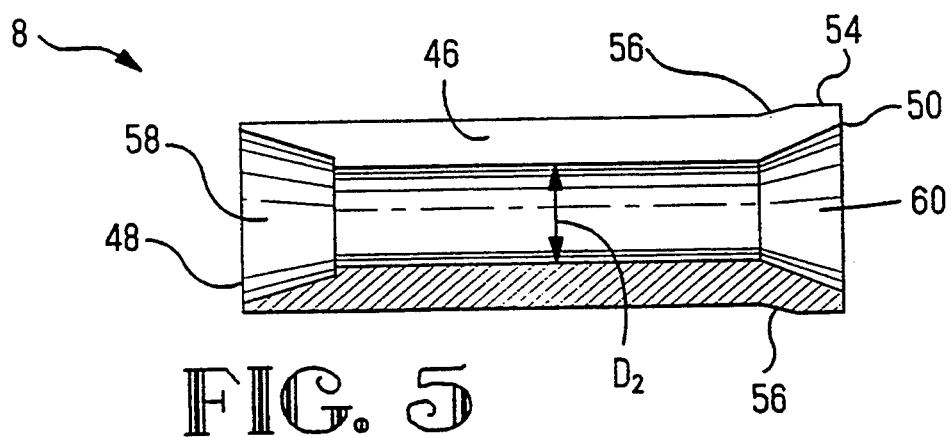
FIG. 5 is a view taken on the lines 5—5 of FIG.
Figure 6:
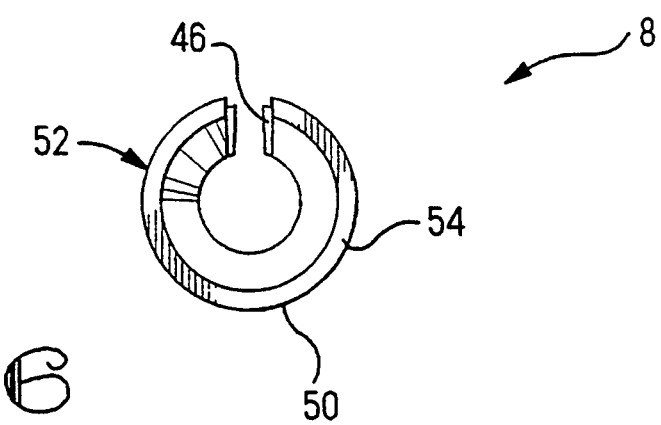
FIG. 6 is a view taken in the direction of the arrow 6 of FIG. 3.

As best seen in FIGS. 1 to 6, the alignment sleeve 8 which was moulded in one piece from a resilient plastics material, for example polyethersulphone, is of circular cross section and is formed with a longitudinal through slit 46 which progressively widens from the forward end 48 of the sleeve 8 towards its rear end 50. A guide collar 52 surrounds the rear end portion of the sleeve 8 and has a rearward, constant diameter, part 54 and a forwardly tapered frusto-conical part 56. As best seen in FIG. 5, the sleeve 8 has, opening into its forward end, a forwardly flared, intermediate fibre receiving, mouth 58 and opening into its rear end, a cladded optical cable core receiving mouth 60. By virtue of the slit 46, the sleeve 8 is resiliently radially expansible. The normal internal diameter D2 (FIG. 5) of the sleeve 8 is smaller than the overall diameter D1 (FIG. 10) of the fibre 6.

Figure 11:
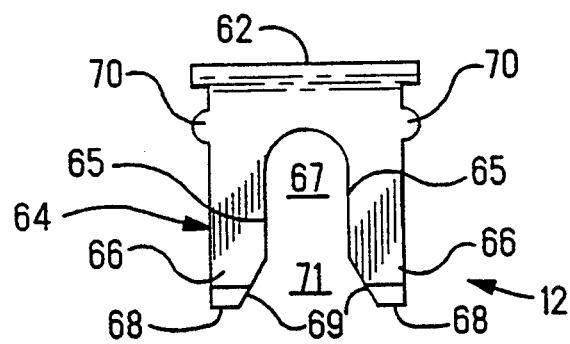
FIG. 11 is an enlarged side view of a fibre fixing clip of the connector.
Figure 12:
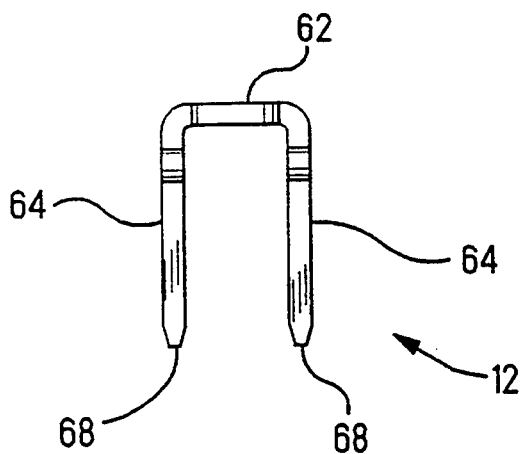
FIG. 12 is an end view of the clip shown in FIG. 11.

As shown in FIGS. 11 and 12, the fibre fixing clip 12 which was stamped and formed from a single piece of sheet metal stock, comprises a flat base 62 from opposite edges of which depend respective fibre retention plates 64, each of which comprises a pair of legs 66 each having a tapered free end portion 68, the legs defining between them an opening 67 having parallel side edges 65. Proximate the base 62 each plate 64 has an outwardly projecting retention pip 70. The legs 66 are chamfered at 69 towards their free end portions 68 so that each pair of legs defines an outwardly flared mouth 71 communicating with the opening 67 between the legs of the pair.

The assembly of the connector 2 will now be described with particular reference to FIGS. 13 to 16.

Figure 13:
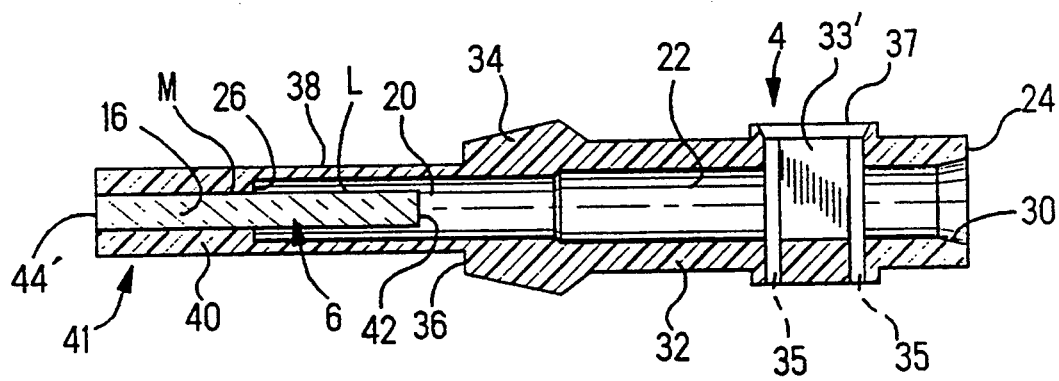
FIG. 13 is a partially diagrammatic axial sectional view showing the intermediate fibre assembled to the housing, the other end of the intermediate fibre also having been polished.
Figure 14:
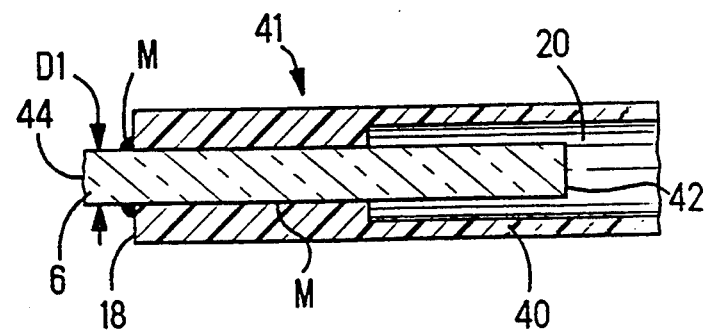
FIG. 14 is a fragmentary axial sectional view of the housing of FIG. 13 before the polishing of said other end of the intermediate fibre.

Firstly, the intermediate fibre 6 is inserted through and is fixed, for example by bonding, to the internal wall of the bore portion 16 of the housing 4 with the polished end 42 of the fibre 6 located in the bore portion 20, with a length L of the fibre 6 protruding into the bore 20, as shown in FIG. 13, the unpolished end 44 of the fibre 6 protruding beyond the mating face 18 of the housing 4 as shown in FIG. 14.

Secondly, when the fixing, for example, bonding material M has cured, the end 18 of the housing 4 and the end 44 of the fibre 6 are polished flat as shown in FIG. 13 or so as to be convex in a direction away from the end 44.

Figure 15:
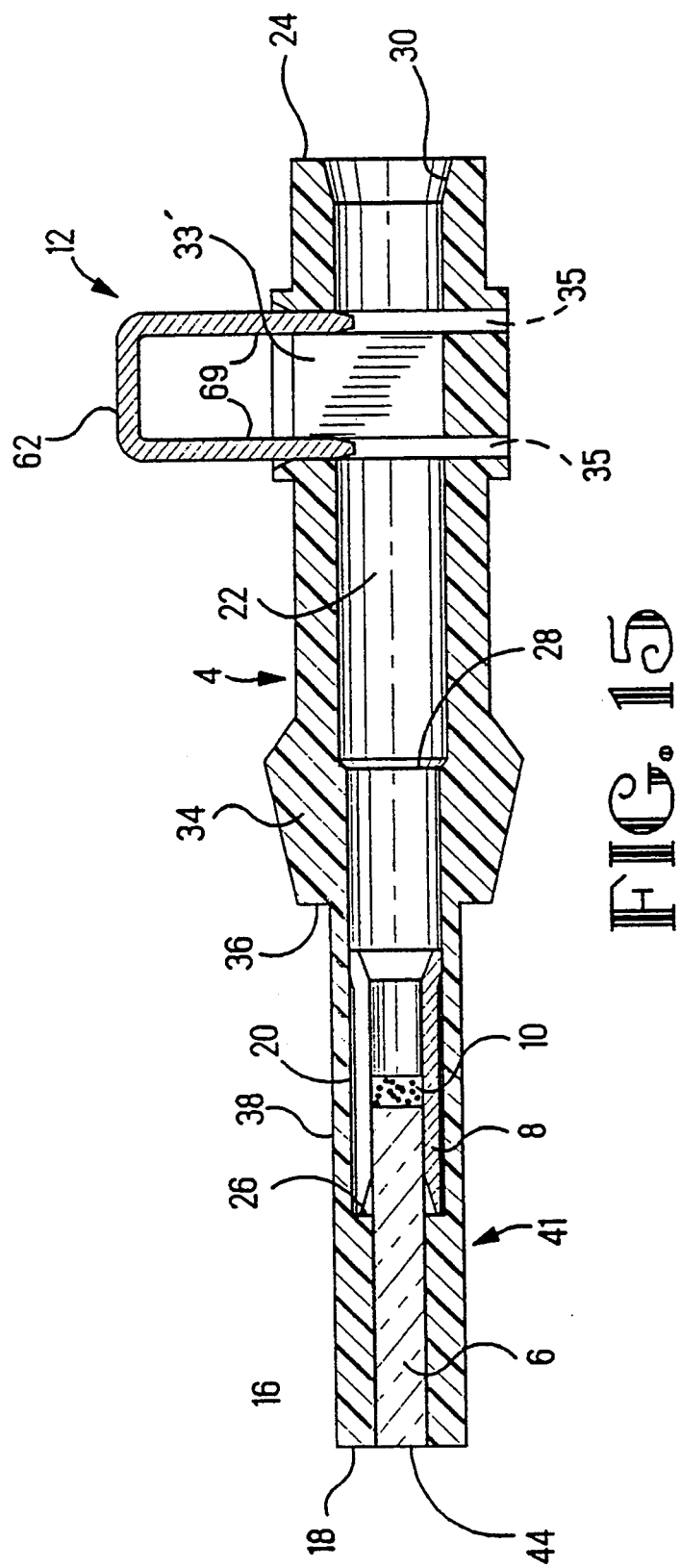
FIG. 15 is a view similar to that of FIG. 13 but showing the alignment sleeve assembled to the housing, a refractive index matching material having been injected into the sleeve.
Figure 16:
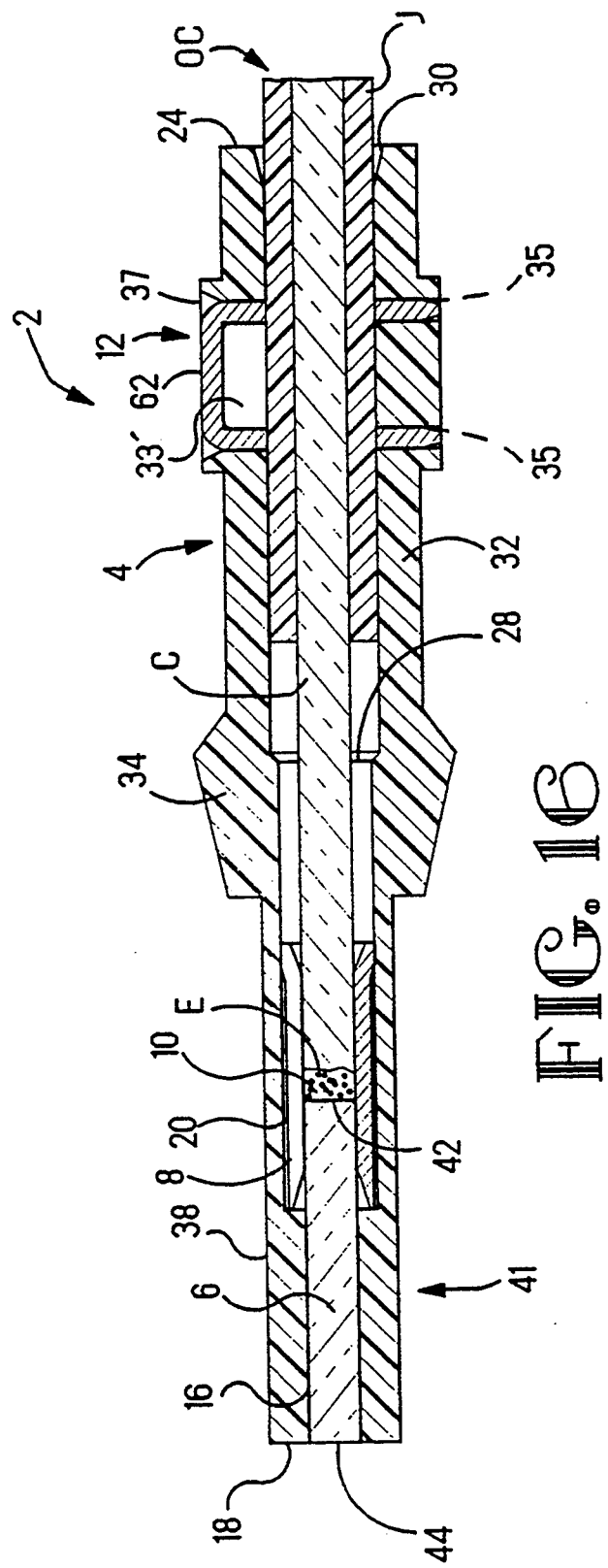
FIG. 16 is a view similar to that of FIG. 15 but showing the stripped end portion of an optical cable inserted into the housing.
Figure 17:
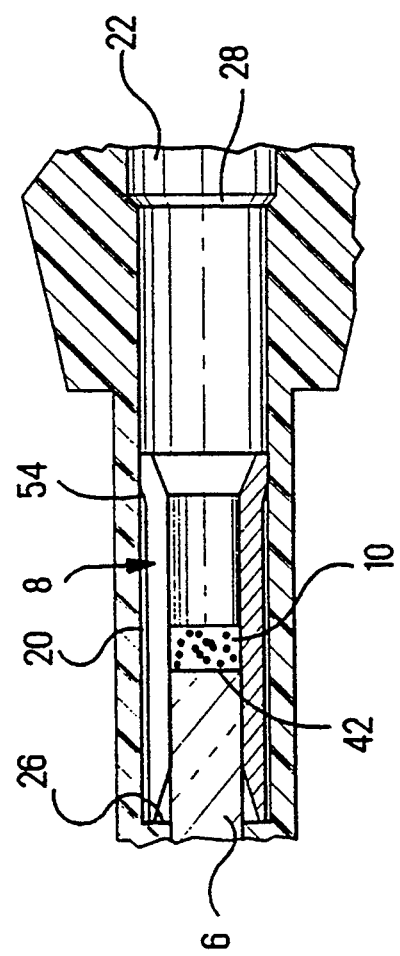
FIG. 17 is an enlarged, fragmentary axial sectional view illustrating details of FIG. 15.

Thirdly, the alignment sleeve 8 is inserted through the mouth 30 of the housing 4 and into the bore portion 20, so that the length L of the intermediate fibre 6 is guided into the sleeve 8 by the mouth 58 thereof, the end 48 of the sleeve 8 abutting the stop shoulder 26 as shown in FIG. 15. The sleeve 8 is inserted through the bore portion 22 and past the shoulder 28, into the bore portion 20, the slit 46 of the sleeve 8 progressively opening resiliently during the insertion thereof as the length L of the fibre 6 is received in the sleeve 8, since the internal diameter D2 of the sleeve 8 is less than the diameter D1 of the fibre 6. By virtue of its resilience, the sleeve 8 is thereby restrained against axial movement in the bore portion 2, since it firmly grips and holds the fibre 6. Some play exists between the outside diameter of the sleeve 8 and the wall of the bore portion 20 as shown in FIG. 17, but not in FIGS. 15 and 16 which are partly diagrammatic.

Fourthly, the refractive index matching material 10 is injected into the sleeve 8 to cover the polished end 42 of the intermediate fibre 6.

The legs 66 of the clip 12 are partially inserted through the cavity 33' into the slots 33 so that as shown in FIG. 15, only the chamfered parts 69 of the legs 66 protrude into the bore portion 22, the clip 12 being retained in that position by virtue of the resilience of the legs 66. The connector 2 is now ready to be shipped to a customer for use.

Figure 18:
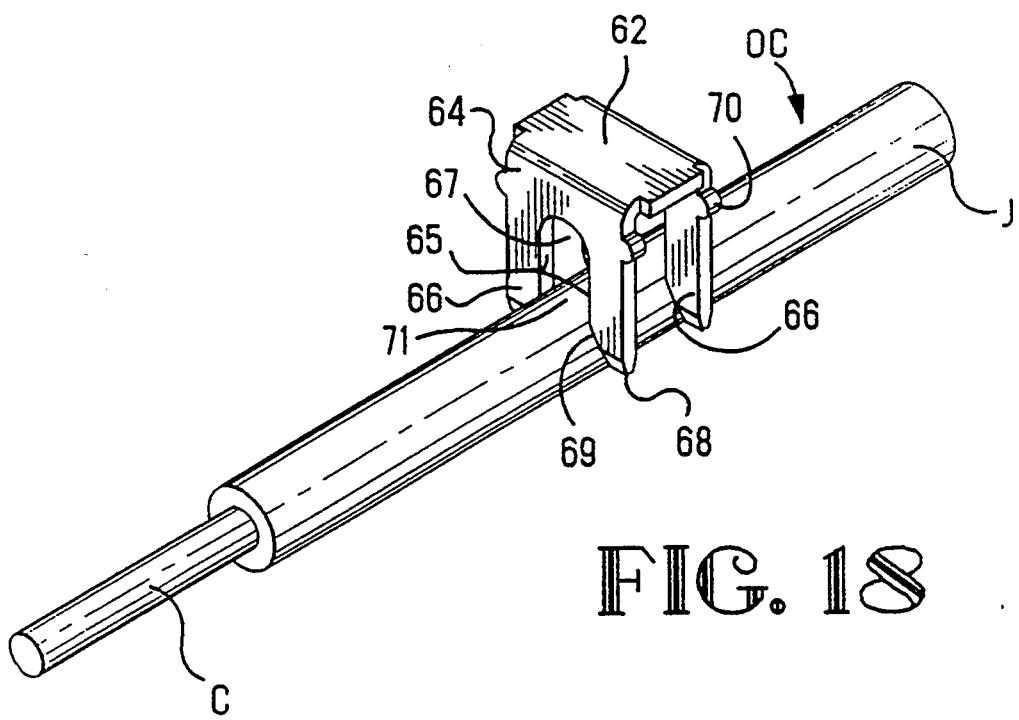
FIGS. 18 and 19 are isometric views illustrating the operation of the fibre fixing clip.

Before use of the connector 2, the customer strips the jacket J (FIGS. 18 and 19) from the end portion of the cladded core C of an optical cable OC. The customer inserts the end E (FIG. 16) of the core C, unpolished, through the mouth 30 of the housing 4 and the bore portion 22 thereof, into the sleeve 6, guided by its mouth 60, so that the jacket J of the cable OC passes the mouths 71 (as shown in FIG. 18) defined between the legs 66 of the clip 12 and the unpolished end E of the core C is immersed in the index matching material 10 as shown in FIG. 16. The customer then presses down the clip 12 to a home position, shown in FIG. 19, so that the legs 66 of the clip 12 are fully received in the holes 35, and the jacket J is fully received in the openings 67 of the clip 12 whereby the edges 65 of the openings 67, bite into the jacket J, (see FIG. 19) but do not impinge upon the cladding therebeneath. The cable OC is thereby securely fixed in the housing 4. The retention pips 70 engage the walls of the slots 33 to hold the clip 12 in its home position and the base 62 of the clip 12 is received in the skirt 37. The connector 2 is now ready for mating with a fibre optics receptacle, optically to connect the core C to a further optical fibre (not shown) by way of the matching material 10 and the intermediate fibre 6.

The cable C is quickly and easily terminated by means of the connector 2, without the need for polishing or hot blading either the face 18 of the connector or the end of the core of the cable C.

In principle, the intermediate fibre 6 may be of any of the existing fibre diameters that are found on the market. Such diameters are for example 1500, 1000, 750 and 500 microns over the cladding of the fibre.

The sleeve 8 acts correctly, optically to align, the intermediate fibre and the cladded core C of the cable OC. The sleeve 8 may be made of a material having the same refractive index as the cladding of the intermediate fibre 6, or the interior of the sleeve 8 may be provided with a coating of the same refractive index as said cladding.

The index matching material 10 may have the same refractive index as the core beneath the cladding, or the same refractive index as the cladding, of the cladded core C. Where the refractive index of the material 10 is the same as that of the cladding the light transmission is not optimal, but the material 10 can act as a repair medium where the cladding is damaged during the stripping of the cable jacket J the light loss may be minimal.

Figure 21:
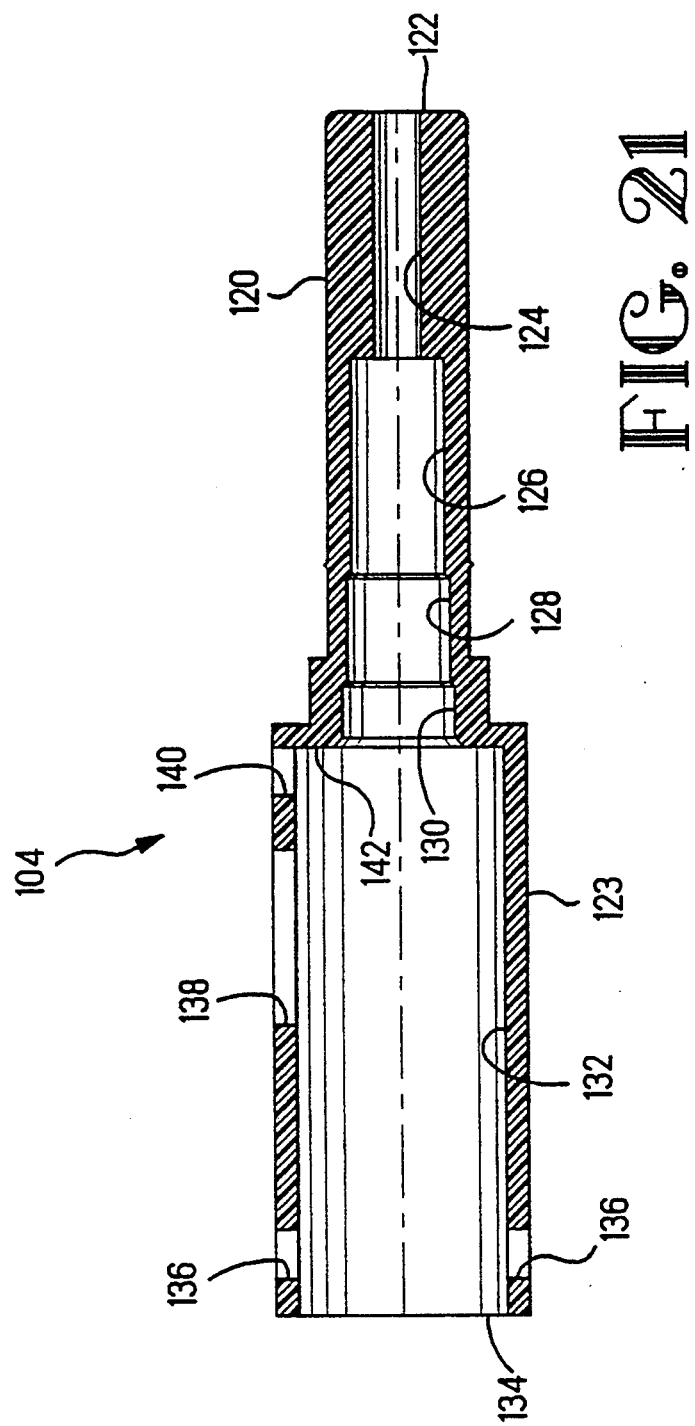
FIG. 21 is a cross-sectional view similar to that of FIG. 20 showing only the connector plug housing.
Figure 22:
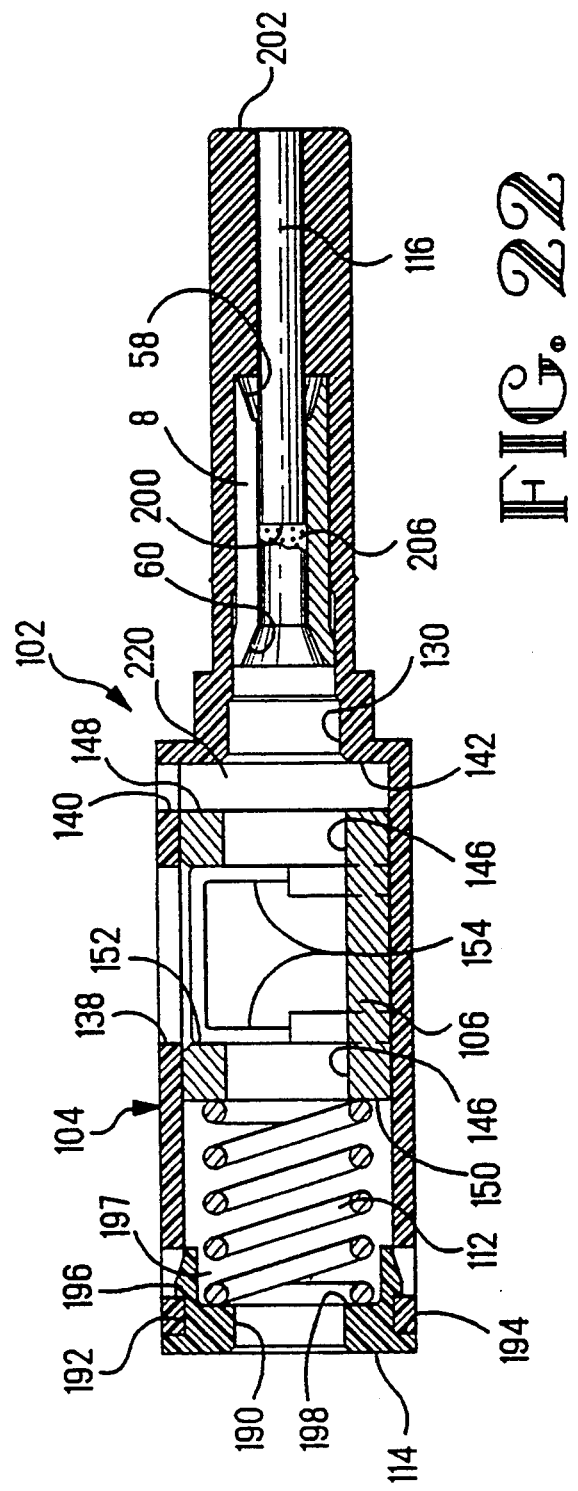
FIG. 22 is a cross-sectional view similar to that of FIGS. 20 and 21 showing a cross-sectional view of the assembled connector prior to the insertion of the fibre.
Figure 23:
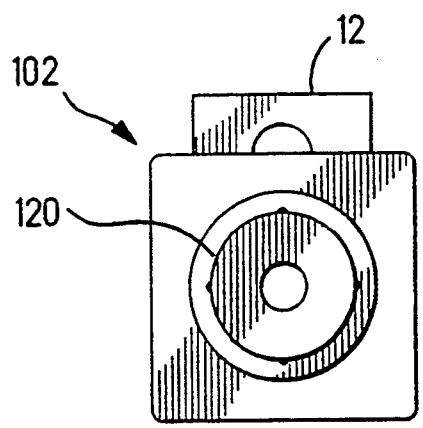
FIG. 23 is a front plan view of the connector shown in FIG. 22.
Figure 24:
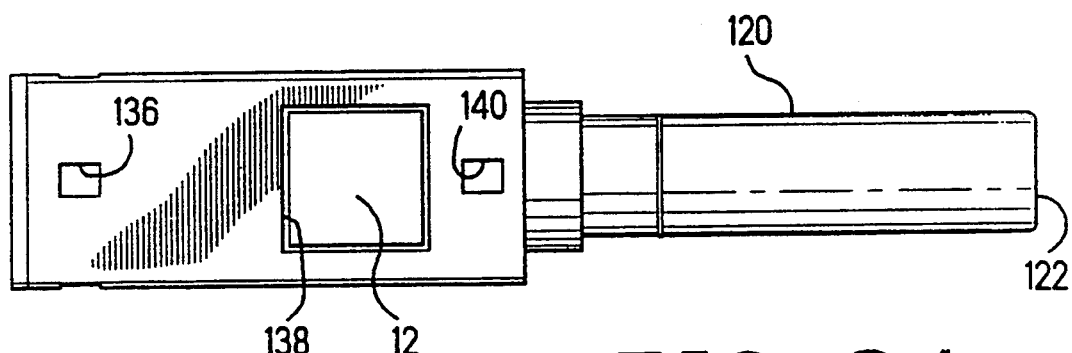
FIG. 24 is a top plan view of the connector shown in FIG. 22.
Figure 25:
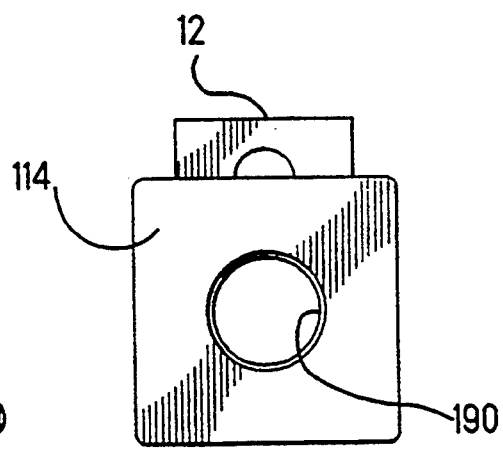
FIG. 25 is an end view of the connector shown in FIG. 22.

With reference now to FIGS. 20–26, an alternate embodiment of the invention will be described. The optical connector is shown generally at 102 and includes a plastic housing 104, a retainer housing 106, a retainer clip 12 (identical to the clip shown and described in the embodiments of FIGS. 11 and 12), an alignment sleeve 8 (identical to the sleeve shown and described in FIGS. 1 and 2), a coil spring 12, an end plate 114, an intermediate fibre 116 and an index matching gel 206 (FIG. 22).

With reference now to FIG. 21, the insulative plug housing 104 includes a forward cylindrical barrel portion 120 having a front face 122 for engagement with a mating fibre connector, and an enlarged open end 123 for receiving the retainer housing 106. In the preferred embodiment of the invention, the forward barrel portion 120 includes an inner bore 124 profiled for receiving a plastic fibre including the core and the cladding of a 1,000 micron plastic fibre. The barrel 120 further includes concentrically aligned cylindrical bores 126, 128 and 130, the purpose for which will be described in greater detail herein. The rear open end 123 comprises an inner cavity 132 of a generally square cross-sectional configuration. The cavity 132 is open at its end and includes an end edge 134. Adjacent to the end edge are apertures 136 which form latching surfaces to be described in greater detail herein. The upper portion of member 123 further includes apertures 138 and 140, which will also be described in greater detail herein. Finally, the inner transition between the cavity 132 and the barrel portion 120 forms an inner rearwardly facing shoulder 142.

As shown in FIG. 22, the retainer housing 106 is provided with a longitudinal bore 146 which is coaxially aligned with the bore 130 and is profiled to receive the plastic fibre with the outer jacket thereon. It should also be appreciated that the retainer 106 is generally square on its cross-section and generally profiled to be received in the cavity 132. The retainer 106 has a forward face 148 facing the surface 142 whereas a rear face 150 is directed towards the open end. The retainer housing 106 further comprises an open aperture 152 profiled to receive the retainer 108 therethrough, and when the retainer is in the position shown in FIG. 22, the opening 152 is aligned with the opening 138 to receive the retainer therethrough. Finally the retainer housing 106 includes two grooves 154 on each side extending from the opening 152 and are profiled to receive the retainer 8 upon insertion therein.

Figure 26:
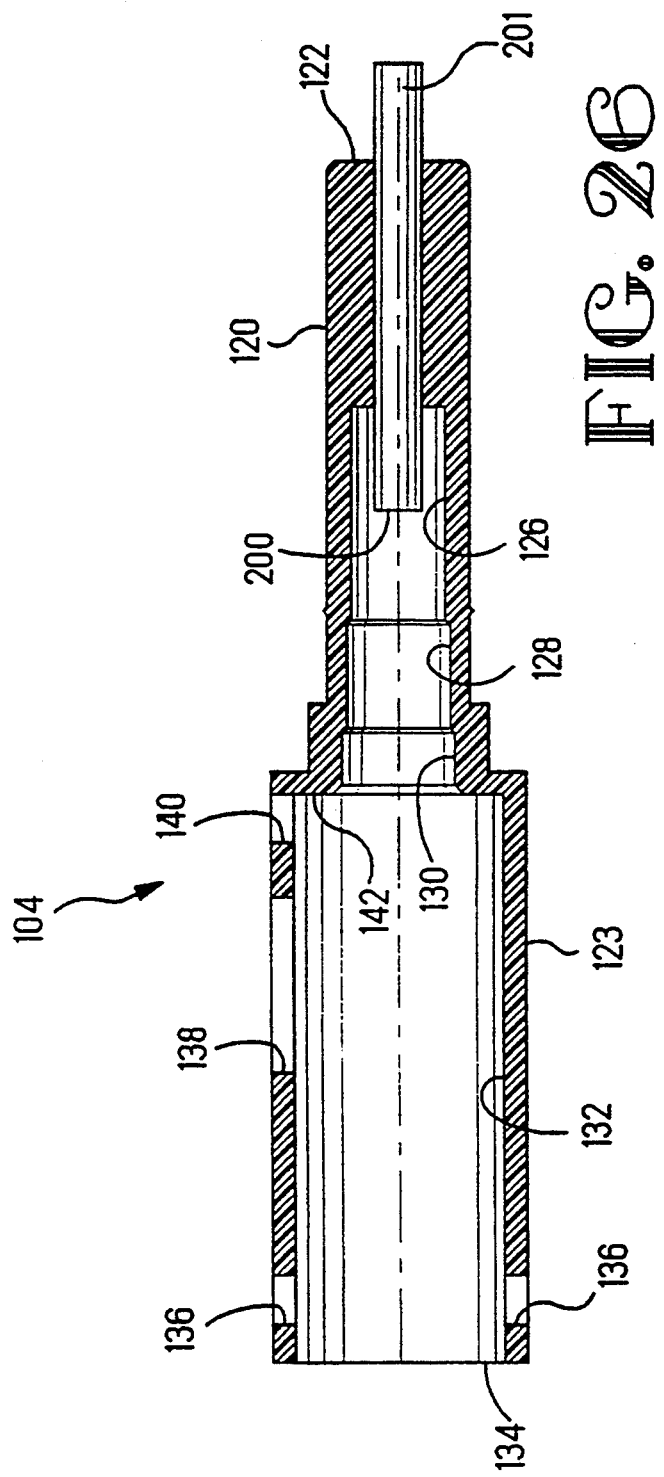
FIG. 26 is a view similar to that of FIG. 21 showing the assembly of the fibre optic connector.

With reference now to FIG. 26, the assembly of the above described connector will be explained in greater detail. An intermediate piece of fibre 116 is polished at its inner end face 200 and inserted into the bore 124 to the position shown in FIG. 26 and fixed in place, for example by means of an adhesive to retain to fibre in this position. It should be appreciated that a portion 201 of the intermediate fibre 116 extends beyond the front face 122 of the plug portion 120. When the adhesive has cured, the fibre 116 is secured in the position shown in FIG. 26, the unfinished end 201 of the fibre 116 can be machine polished so that the fibre 116 has a forward face 202 (FIG. 22) which is flush with the forward surface 122. The alignment sleeve 8 is now inserted into the plug portion 120 with the end 58 inserted first such that it resides in the bore portion 126 (FIG. 21) while the guide collar 54 resides in the bore portion 128 (FIG. 21). An index matching gel 206 is now injected against the inner polished surface 200 of the intermediate fibre 116 as best shown in Figure 22.

With the intermediate fibre fully positioned in place, the remainder of the connector can be assembled. The retainer housing 106 is now inserted through the open end of the plug housing 104 such that the opening 152 is in the same orientation as the aperture 138 on the upper side wall of the plug housing 104. The retainer housing 106 is moved to the position where the opening 152 and the aperture 138 are aligned. The U-shaped clip 12 is then inserted such that the openings 67 in both plate portions 64 are longitudinally aligned with the fibre-receiving bore 146, thereby positioning the plate portions 64 within grooves 154 (FIG. 22) in the retainer housing. The U-shaped clip 12 is only partially inserted at this stage into the position shown in FIG. 23, which locks the retainer housing in the position shown in FIG. 22, as the U-shaped clip is locked within the aperture 138 in the outer housing. The spring 112 and end cap 114 are then inserted thereby spring loading the retainer housing 106 in a forward direction. This completes the connector assembly which would be shipped to a customer for field installation.

Figure 19:
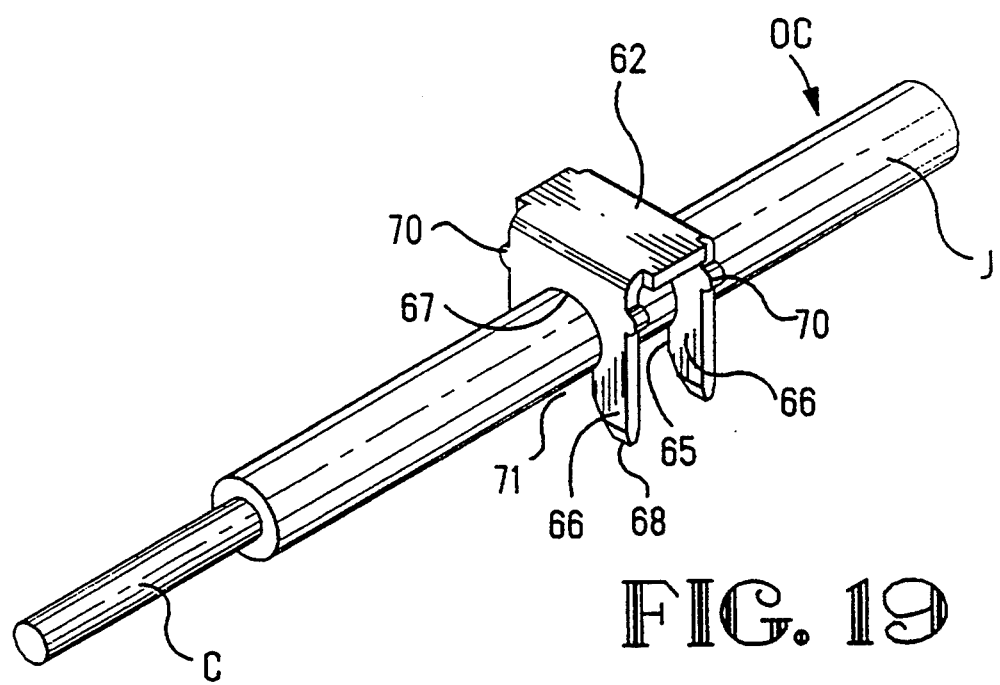
Figure 20:
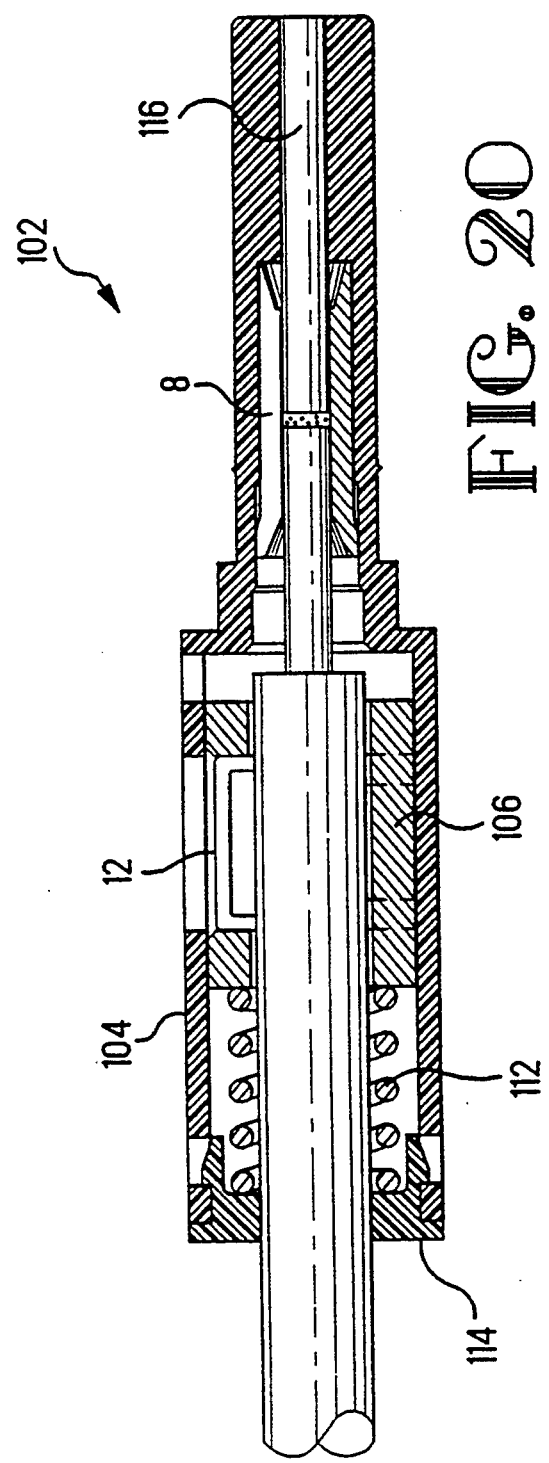
FIG. 20 is a cross-sectional view of an alternate embodiment of the assembled connector.

As shown best in FIGS. 18 and 19, a plastic optical fibre is shown generally at OC and includes an outer insulative jacket J where the inner fibre includes an inner plastic core C. To use the connector 102 as described above, a portion of the outer jacket J only is stripped from the fibre OC thereby exposing a portion of the combined plastic fibre and cladding material. This fibre can then be inserted, stripped end first through bore 190 of the end cap 114 through the coil spring 112, through the bore 146 of the retainer housing 106 such that the stripped end of the fibre optic cable is positioned into the sleeve 8 and into abutment with the gel 206. Once the fibre cable OC is pushed as far forward as possible, the U-shaped clip 12 can then be pushed downwardly into the retainer housing such that the side edges 65 of the U-shaped clip 12 skive into the jacket only of the plastic fibre thereby fixing the longitudinal movement of the fibre. This positions the portions 66 within the grooves 154 of the retainer housing 106. It should be appreciated that when the U-shaped clip 12 is in its fully downward position, the retainer housing 106 is now free to float within the opening 132 under influence of the compression spring 112.

Thus with the embodiment as described herein, the previously mentioned problem of pistoning between the jacket and the core and fibre has been eliminated. That is, the fibre OC can float in either direction under the influence of compression spring 112 to maintain abutting engagement between the end face of fibre OC and the intermediate fibre 116. As best shown in FIG. 22, a compression space 220 is formed between surfaces 142 and 148 which is the amount of forward movement available for the retainer 106.

I claim:

1. A fibre optic connector comprising a plug housing having a front mating end and a rear fibre receiving end, said front mating end having a bore carrying an intermediate optical transmission member having a front finished end and an inner end within the bore, said connector being characterized in that:
said housing has a loading mechanism for gripping a fibre to be inserted and biasing said fibre into end-to-end contact with said intermediate optical transmission member.

2. A fibre optic connector according to claim 1, characterized in that said housing includes a rear cavity, the loading mechanism having a fibre holding retainer positioned within said rear cavity, said retainer being in communication with said bore and floatable within said cavity.

3. A fibre optic connector according to claim 2, characterized in that said retainer is comprised of a plastic housing, having a fibre receiving bore therethrough which is coaxially aligned with said bore.

4. A fibre optic connector according to claim 2, characterized in that said fibre holding retainer includes a holding member associated with said retainer to fix said cable to said retainer.

5. A fibre optic connector according to claim 4, characterized in that said holding member comprises a clip member movable between a fibre insertion position, to a fibre clamping position where said clip grasps the jacket surrounding the fibre.

6. A fibre optic connector according to claim 5, characterized in that said rear cavity has an aperture profiled to receive said clip member therethrough such that when in said fibre insertion position, said clip member axially locks said retainer within said cavity, and when said clip member is moved to said fibre clamping position, said clip member clears said aperture, and allows axial movement of said retainer.

7. A fibre optic connector according to claim 2, characterized in that said plug housing includes an end cap enclosing an open end of said cavity, and a spring member positioned medially of said end cap and said retainer for spring loading said retainer housing forward.

8. A fibre optic connector according to claim 1, characterized in that the optical transmission member is an intermediate optical fibre and the connector further includes a fibre aligning member disposed about the inner end of the intermediate fibre and adapted to receive the fibre to be inserted for alignment therebetween.

9. A connector as claimed in claim 8 characterized in that the fibre alignment member is a circular cross-section sleeve of resilient material formed with a longitudinal through slit, the sleeve resiliently gripping said length of the intermediate optical fibre at a forward end and open to receive the to be inserted optical fibre at a rearward end.

10. A connector as claimed in claim 9, characterized in that the through slit in the alignment sleeve increases in width towards an external guide collar surrounding a rear end portion of the alignment sleeve.

11. A connector as claimed in claim 10 characterized in that the collar comprises a rearward portion of constant cross-section, and a forwardly tapered frusto-conical portion.

12. A connector as claimed in claim 9, characterized in that the sleeve has a forwardly flared mouth opening into the forward end of the sleeve for guiding said length of the intermediate fibre into the sleeve, the sleeve having at its rear end a rearwardly flared mouth for guiding the to be inserted fibre into the sleeve.

13. A connector as claimed in claim 9, characterized in that the sleeve is made of a material having the same refractive index as the cladding of the intermediate fibre, or the sleeve is provided with a coating of the same refractive index as the cladding of the intermediate fibre.

14. A connector as claimed in claim 8 characterized in that the bore includes a first bore portion wherein the intermediate optical fibre is fixed and a second bore portion wherein the alignment member is positioned, said second bore portion comprising a first part adjoining the first bore portion and a second part opening into said other end of the housing, a frusto-conical alignment sleeve guide shoulder bonding said first and second parts and tapering towards the first bore portion.

15. A connector is claimed in claim 8, characterized in that a clip is provided in the housing for retaining the to be inserted fibre in the fibre aligning member, the clip being positioned to allow the to be inserted fibre to pass through the clip, and being capable of being pushed home in the housing to grip the to be inserted fibre.

16. A connector as claimed in claim 8, characterized in that the diameter of the intermediate optical fibre substantially exceeds the internal diameter of the fibre aligning member prior to the assembly of the aligning member to the intermediate optical fibre, whereby the aligning member resiliently grips said length of the intermediate optical fibre.

17. A connector as claimed in claim 1, characterized in that the one front mating of the housing provides the mating end of a plug defined by the housing, the first end face of the optical transmission member being coplanar with said one end of the housing, or being convex in a direction away from said one end.

18. A connector as claimed in claim 1, characterized in that an index matching material is disposed between the optical transmission member and the to be inserted optical fibre.

19. A fibre optic connector for optically connecting a to be inserted optical fibre with another optical component, comprising; a housing defining a bore therein extending between a front mating end alignable with the other optical component and a rear fibre receiving end for receiving the to be inserted optical fibre, a intermediate optical transmission member positioned along said bore for optically coupling the other optical component and the to be inserted optical fibre, a fibre holding retainer floatable within the housing member and engageable with the to be inserted optical fibre and a biasing member acting upon the fibre retainer to bias said fibre into end-to-end contact with said intermediate optical transmission member.

20. The optical fibre connector of claim 19, further including a fibre alignment member in communication with the intermediate transmission member for receiving and aligning the to be inserted optical fibre therewith.

* * * * *